United States Patent [19]

Shimizu et al.

[11] 4,203,841
[45] May 20, 1980

[54] APPARATUS FOR HIGH-EFFICIENT MICROBIOLOGICAL OXIDATION TREATMENT

[75] Inventors: Norio Shimizu; Youji Odawara; Tetsuo Yamaguchi; Setsuo Saitou, all of Hitachi; Azuma Nakaoka, Chiba; Kazuaki Ichihashi, Yamaguchi, all of Japan

[73] Assignee: Hitachi, Ltd., Japan

[21] Appl. No.: 857,890

[22] Filed: Dec. 6, 1977

Related U.S. Application Data

[63] Continuation of Ser. No. 722,034, Sep. 10, 1976, abandoned.

[30] Foreign Application Priority Data

Sep. 10, 1975 [JP] Japan .................................. 50/108889

[51] Int. Cl.² ............................ C02C 1/06; C02C 1/12
[52] U.S. Cl. ..................................... 210/205; 210/220; 261/77; 261/123
[58] Field of Search ........................................ 210/2-9, 210/14, 15, 63 R, 169, 198 R, 199, 205, 207, 220, 221 R; 261/77, 123

[56] References Cited

U.S. PATENT DOCUMENTS

| 3,043,433 | 7/1962 | Singer | 210/14 |
| 3,353,676 | 11/1967 | Hirsch | 210/199 |
| 3,574,331 | 4/1971 | Kurosawa et al. | 210/15 |
| 3,617,033 | 11/1971 | Ichikawa | 261/123 |
| 3,753,897 | 8/1973 | Lin et al. | 210/15 |
| 3,770,128 | 11/1973 | Kast | 210/169 |
| 3,807,565 | 4/1974 | Langston | 210/201 |
| 3,931,370 | 1/1976 | Murphy | 261/77 |
| 3,953,003 | 4/1976 | Mahig | 261/71 |
| 3,968,086 | 7/1976 | Romanowski | 261/77 |
| 3,983,031 | 9/1976 | Kirk | 210/15 |

Primary Examiner—Charles N. Hart
Assistant Examiner—Peter A. Hroskoci
Attorney, Agent, or Firm—Craig and Antonelli

[57] ABSTRACT

Waste water containing organic materials is introduced into an aeration tank, and is subjected to aeration treatment in the presence of activated sludge, while supplying oxygen to the aeration tank. The tank provided with an air diffusion pipe at the bottom of the tank, an air dispersion device above the air diffusion pipe and a plurality of inside cylinders above the air dispersion device. An overall circulating stream and partial circulating streams are generated in the aeration tank.

10 Claims, 5 Drawing Figures

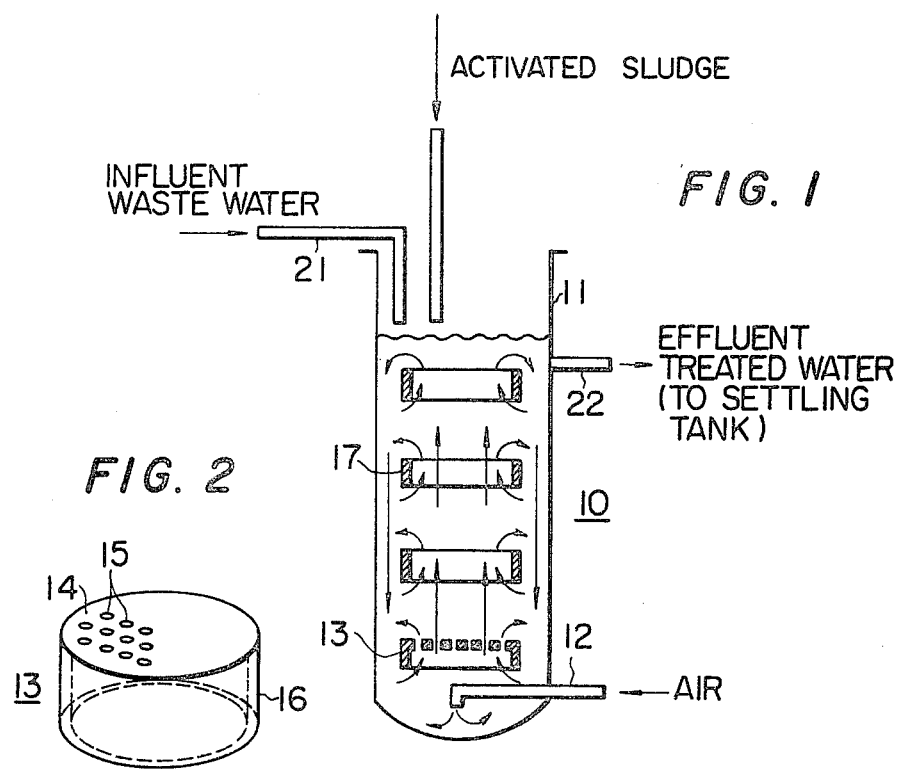
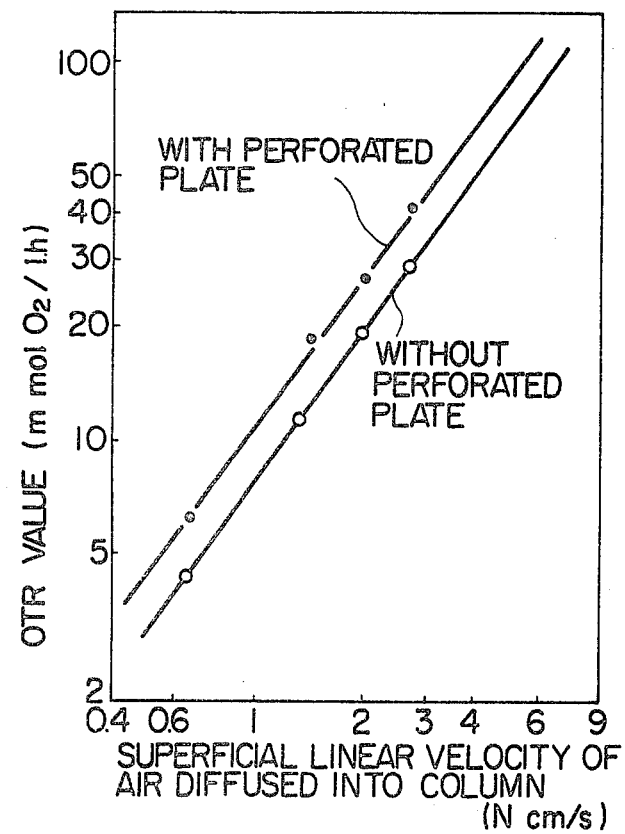

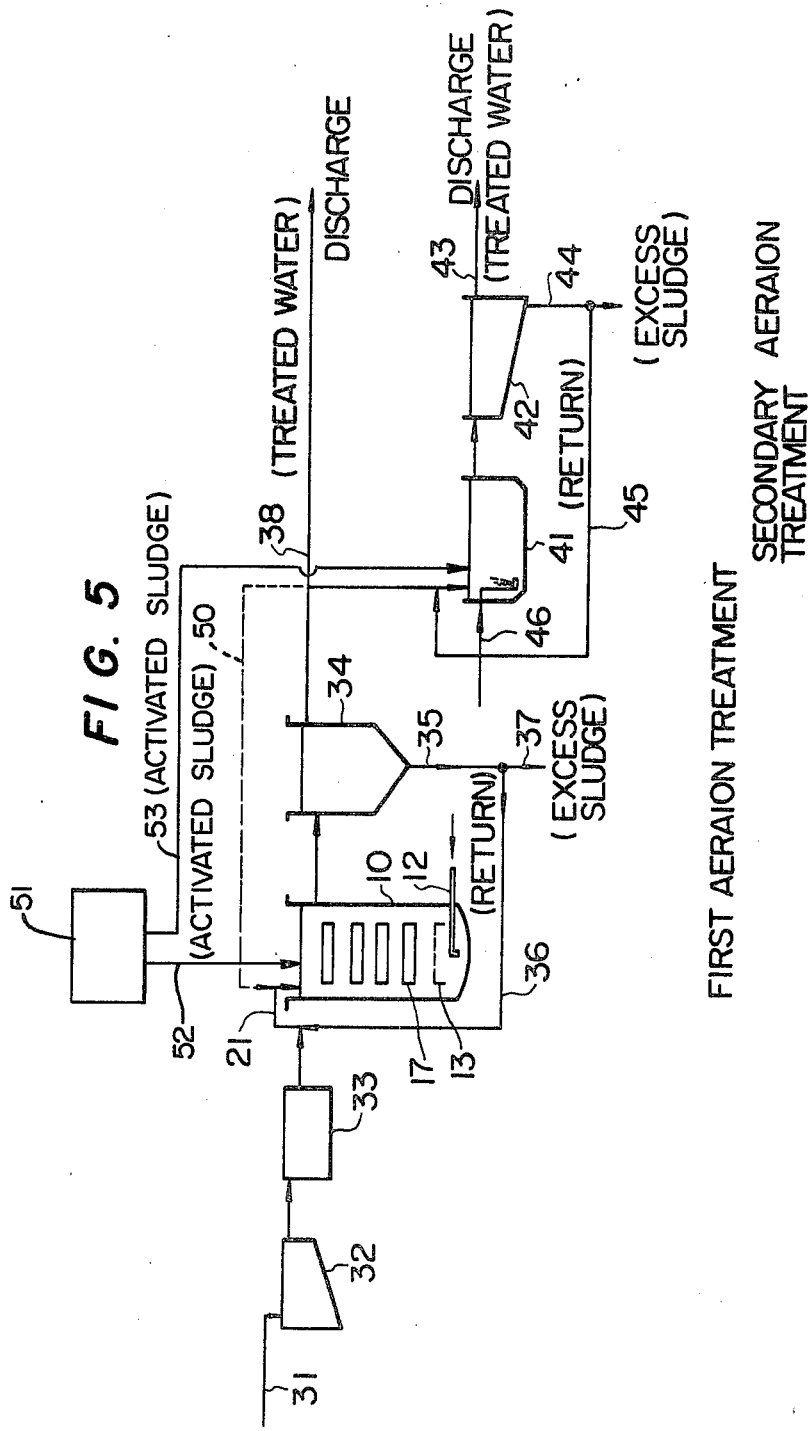

APPARATUS FOR HIGH-EFFICIENT MICROBIOLOGICAL OXIDATION TREATMENT

This is a continuation of application Ser. No. 722,034, filed Sept. 10, 1976 now abandoned.

This invention relates to an apparatus for high-efficient microbiological oxidation treatment of waste water containing organic materials.

A kind of microbiological treatment, the so-called "activated sludge treatment", has been so far applied to the treatment of waste water containing organic materials, and it is said that this microbiological treatment is an almost established technique. However, the microbiological treatment has various disadvantages due to the limit of the actions of the microorganisms.

Heretofore, the public has not had serious concerns with the waste water treatment, and these disadvantages of the prior technique have not impaired the object of the waste water treatment. However, environmental pollution controls have recently become a keen concern to the public, and the social demand can hardly be satisfied so long as the disadvantages of the prior technique are not overcome.

According to the conventional standard method using activated sludge, a tank of so-called "pool pond-type" having a liquid depth of 4 to 5 meters is used, where a large number of air diffusers are provided at the tank bottom to diffuse air into the tank, and a liquid in the tank is mixed and stirred by air bubble streams and at the same time oxygen required for microorganisms (activated sludge) is dissolved into the liquid. Besides this standard method, there are available other methods, for example, a step aeration method, a complete mixing method, a contact stabilization method, etc. Disadvantages common to these methods are given below:

(1) low percent oxygen utilization
(2) low reaction rate
(3) difficulty in high load aeration treatment
(4) larger area for the aeration tank and
(5) liability to clogging of air diffuser, etc.

A method using an aeration tank of deep depth aeration type has been proposed to improve these disadvantages. The method has such advantages as high oxygen utilization rate (smller amount of the air to be diffused) and smaller area for the aeration tank. Since the amount of the air to be diffused is very small, for example, ⅓ to 1/5 of that required for the standard method, a complete mixing of air bubbles becomes difficult. Furthermore, since the oxygen transfer rate (which will be hereinafter referred to as "OTR") of the method is almost equal to that of the pool pond-type method, the reaction rate becomes low. Furthermore, since the stirring of the liquid is gentle, scales are liable to be deposited on every part in the tank. That is, the probability of clogging the air diffuser is disadvantageously higher.

An object of the present invention is to provide an apparatus for a high-efficient microbiological oxidation treatment, which assures a high load treatment of waste water containing organic materials.

Another object of the present invention is to provide an apparatus for a high-efficient microbiological oxidation treatment capable of lowering the biochemical oxygen demand (which will be hereinafter referred to as "BOD").

Another object of the present invention is to elevate the reaction rate and make the area for the aeration tank smaller in the treatment of waste water containing organic materials.

To attain these objects, the present invention provides an aeration apparatus for aerating waste water containing organic materials by introducing the waste water to a deep aeration tank and effecting an aeration treatment, while supplying oxygen to the tank, characterized by the aeration of a high OTR value to the liquid in the tank.

A current activated sludge method is based on a mixed system of bacteria and protozoa, where bacteria in activated sludge digest dissolved organic materials in waste water in an aeration tank and are grown, and protozoa (such as Vorticella, Epistylis, Opercularia, Carchesium, Paramoecium, and Colpidium) prey upon the propagated bacteria. Generation time of bacteria is s short as 20 to 120 minutes, whereas that of protozoa is, for example, as long as 10 hours in the case of Paramoecium. The oxygen utilization rate is so low that the rate of air to be diffused into the aeration tank is low, and the estimated OTR value is about 1 mmol $O_2$/liter hour at most. Thus, the treating rate is low, and a treatment of waste water containing organic materials at a high concentration is difficult. That is, it is impossible to carry out a high load treatment of waste water according to the current activated sludge method.

The present inventors conceived that it was preferable to use activated sludges consisting mainly of bacteria having a short generation time, that is, a high growth rate, and carried out waste water treatments by increasing the OTR value to a liquid in an aeration tank, acclimating activated sludge, and particularly utilizing a floc consisting mainly of bacteria. That is, according to the present invention, a high-efficient activated sludge treatment of waste water containing organic materials is carried out by introducing the waste water into an aeration tank, and effecting aeration treatment of the waste water by supplying oxygen (which may be in the form of air) to the tank in the presence of activated sludge, where the oxidation of the organic materials is carried out at an oxygen transfer rate of 5 to 80 mmol $O_2$/liter hour to the tank, and especially a floc consisting mainly of bacteria is formed at an oxygen transfer rate of at least 10 mmol $O_2$/liter hour.

The present invention will be described, referring to the accompanying drawings:

FIG. 1 is a schematic vertical cross-sectional view of an apparatus embodying one example of the present method for aeration;

FIG. 2 is a schematic view showing one embodiment of an air diffuser device (perforated plate) to be used in the present invention;

FIG. 3 is a schematic view showing one embodiment an inside cylinder to be used in the present invention;

FIG. 4 is a graph showing relations between superficial linear velocity of air diffused into the column and OTR values; and FIG. 5 is a flow diagram showing one embodiment of a system for treating waste water, wherein an aeration tank of the present invention is incorporated.

Results obtained when waste water treatments were carried out by microorganisms (protozoa and bacteria) in the presence of activated sludge are given below.

| "OTR" value (mmol O$_2$/liter hour) | State of activated sludge | Floc settling ability | "BOD" volumic load (Kg/m$^3$.d) | "BOD" removal (%) |
| --- | --- | --- | --- | --- |
| 1 | More protozoa | Good | 1 | 92 |
| 5 | More protozoa | Good | 2.5 | 90 |
| 10 | Less protozoa and more bacteria floc | Good | 4.0 | 91 |
| 20 | Scarcely any protozoa, and mostly bacteria floc | Good | 6.8 | 92 |
| 30 | Scarely any protozoa, and mostly bacteria floc | Good | 9.8 | 90 |
| 70 | Scarcely any protozoa, and mostly bacteria floc | Good | 12 | 90 |
| 80 | Scarcely any protozoa, and mostly bacteria floc | Good | 13 | 90 |
| 100 | Scarcely any protozoa, and mostly bacteria floc | Poor | 13.5 | 85 |

According to the current OTR value of 1 mmol O$_2$/liter hour, the BOD volumic load is up to 1 Kg/m$^3$.d, where much more protozoa are used. To increase the OTR value to 5 mmol O$_2$/liter hour, the BOD volumic load is elevated, but there are considerably more protozoa. When the OTR value is increased to 10 mmol O$_2$/liter hour, the proportion of protozoa is decreased, whereas the proportion of bacteria floc is increased. Thus, the BOD volumic load up to 4.0 Kg/m$^3$.d is made possible, and a high load treatment and high rate treatment can be attained. When the OTR value is much more increased, the BOD volumic load can be increased correspondingly.

Heretofore it has been deemed that, when the OTR value is increased, that is, when a rate of air to be diffused is increased, the activated sludge floc would be dispersed. However, it has been found that when the OTR value is increased, the activated sludges are formed mainly into bacteria flocs, and can have a good settling ability without any dispersion of the flocs.

However, when the OTR value is increased to 100 mmol O$_2$/liter hour, no bacteria flocs having a high specific gravity are formed owing to vigorous stirring of the liquid, making the waste water treatment difficult. Furthermore, a large amount of air is required, and the running cost is greatly increased, making the method practically unsuitable. According to the test, the method is still practical when the OTR value is 80 mmol O$_2$/liter hour.

By increasing the OTR value, the activated sludges are formed into flocs mainly of bacteria, and a high load treatment and a high speed treatment are possible. According to the test, a preferable range for the OTR value is 10 to 65 mmol O$_2$/liter hour, and a more practical range is 25 to 65 mmol O$_2$/liter hour.

The bacteria to be used in the method slightly depend upon kind of waste water containing organic materials, but are a mixed floc of at least one of the genera Zoogloea, Bacillus, Escherichia, Pseudomonas, Alcaligenes, Paracolobacterium, Nocardia, Flavobacterium, Achromobacter, Aerobacter, Bacterium, Cornebacterium, Microbacterium, Nitrosomones, Nitrobacter, Azotobacter, etc.

According to the present invention, the following apparatus is practically used to keep said range for OTR values economically easier, make the area for the aeration tank smaller, and prevent the clogging of the air diffusion pipes. That is, an apparatus is provided for high-efficient activated sludge treatment, in which waste water containing organic materials is introduced into a deep aeration tank and aeration treatment of the waste water is carried out while supplying oxygen to the tank. The aeration tank comprises an aeration tank body consisting of a cylindrical vessel, oxygen-diffusing and air-dispersing means provided in and at the bottom of the aeration tank body, at least one inside cylinder or an air dispersion device having a cylindrical skirt extending downwardly at the bottom of the device, which can be arranged in plurality in series at distances above the air-dispersing means. The inside cylinder or the air dispersion device is so arranged as to form partial circulating streams flowing along both outside and inside of the inner cylinder or the skirt of the air dispersion device and an overall circulating stream ascending along the center part of the inside cylinder or the skirt of the air dispersion device, and descending along the outside of the inside cylinder or the skirt of the air dispersion device.

According to the present invention, a combined structure of an oxygen (or air) diffuser, which will be hereinafter referred to as an air diffusion pipe, and an air dispersion disk provided above the air diffusion pipe can be employed as the oxygen-diffusing and air-dispersing means provided in and at the bottom of the aeration tank, but the air diffusion pipe and the air dispersion disk can be integrated together. It is desirable that a nozzle on the air diffusion pipe be arranged so that air or oxygen may be injected toward the bottom of the aeration tank. At least one inside cylinder or air dispersion device having a cylindrical skirt extending downwardly at the bottom of the device is provided. As the inside cylinder or the air dispersion device, a plurality of open cylinders can be arranged stagewise, as shown in FIG. 1; a plurality of the air dispersion devices can be arranged at every second or third stage between the inside cylinders; or a plurality of only the air dispersion devices can be arranged throughout the tank. Selection of the arrangement can be appropriately made in view of the properties of waste water to be treated, etc.

The inside cylinders or air dispersion devices are arranged in series in the tank so as to form partial circulating streams flowing along the inside and outside of the individual inside cylinder or the skirt of the air dispersion device, and an overall circulating stream ascending along the center parts of the inside cylinders or skirts of the air dispersion devices, and descending along the outsides of the inside cylinders or skirts of the air dispersion devices.

Now, the present invention will be described in detail, referring to the drawings.

In FIG. 1, waste water inlet pipe 21 is provided at the top of aeration tank body 11, and an effluent outlet pipe 22 is provided at a level just below the waste water inlet pipe. Air diffusion pipe 12 is provided at the bottom of the tank body, and air dispersion device 13 is provided closely above the pipe as an air-diffusing and dispersing means. Air dispersion device 13 is comprised of a perforated plate 14 having relatively large perforations 15 and a cylindrical skirt 16 extending downwardly at the bottom of the perforated plate. Air dispersion device 13 acts to make the air diffused from air diffusion pipe 12 into finer bubbles. A plurality of inside cylinders 17 are provided stagewise at definite distances from each other above air dispersion device 13, and act to perform good mixing and circulation of the liquid in the tank. Inside cylinder 17 is comprised mainly of a skirt or cylindrical wall 18. The size of the perforation in the perforated plate constituting the air dispersion device is 5 to 30 mm in diameter, preferably 10 to 15 mm in diameter, and a perforation ratio of the perforated plate is at least 20%. Length of cylindrical skirt 16 of air dispersion device 13 is ½ of the diameter of the perforated plate as the standard, but a range of ¼ to ⅔ of the diameter of the perforated plate can be sufficient in the present invention. Length of inside cylinders 17 provided in plurality stagewise above the air dispersion device is likewise given. Respective diameters of the air dispersion device and inside cylinder are such that the cross-sectional area (area of perforated plate) of the device or inside cylinder may be in a range of 50 to 80%, preferably about 50%, of the cross-sectional area of the aeration tank body. Appropriate distance between the air dispersion device and inside cylinders, or the inside cylinders is approximately equal to the diameter of the inside cylinder or air dispersion device. In general, the aeration tank body has a diameter of from 0.5 to 10.0 m and a depth of 5.0 to 30 m.

In the aeration tank as described above, air injected from air diffusion pipe 12 impinges against air dispersion device 13, and ascends through the tank, while being dispersed into fine air bubbles. The ascending air bubbles pass along the insides of inside cylinders 17 provided above the air dispersion device toward the liquid surface. At the same time, the liquid ascends together with the ascending air bubbles, turns to the outsides of the inside cylinders at the level of liquid surface, and then descends through an annular channel between the inside cylinders and the tank body, thereby generating an overall circulating flow of the liquid. On the other hand, a portion of the descending liquid stream passing through the annular channel is sucked inwardly by the ascending liquid stream passing along the insides of the inside cylinders at free spaces between the inside cylinders, and flows into between the inside cylinders. At the same time, a portion of the liquid and air bubbles also flows outwardly into the annular channel from the inside between the inside cylinders. Thus, partial circulating streams are generated around the individual inside cylinders. That is, an overall circulating stream and partial circulating streams are generated in the aeration tank, as indicated by arrows in FIG. 1. Consequently, good air-liquid contact and high OTR values can be obtained, as compared with the cases using no perforated plate and inside cylinders, as shown in FIG. 4.

Since the present aeration tank can readily provide high OTR values, the growth rate of activated sludge becomes higher. That is, the reaction rate is accelerated and a high speed treatment is made possible.

When waste water containing organic materials is treated, using this aeration tank, and if a BOD concentration of influent waste water is so low that a BOD concentration of treated water at 90% removal is within a range of effluent control limit value, the treated water can be discharged only by carrying out solid-liquid separation after the primary aeration treatment. However, in the case of high BOD concentration, the BOD value of the treated water is still, for example, 100 to 300 ppm even if more than 90% removal can be attained, and thus the treated water cannot be discharged as effluent as such. That is, a secondary aeration treatment is required. In that case, the treated waste water can be further treated according to the conventional method, or using the present aeration tank of perforated plate type as the secondary treatment.

In FIG. 5, one embodiment of a high-efficient system for treating waste water containing organic materials, wherein an aeration tank of the present invention is incorporated, is illustrated. Influent waste water flows into settling tank 32 through conduit 31 at first, and subjected to preliminary treatment therein. Then, the waste water is led to a deep aeration tank 10 of the perforated plate type of the present invention through a screen 33, and subjected to aeration treatment. Return sludge from settling tank 34 is led to the aeration tank together with the treated waste water through conduits 35 and 36. Treated waste water is led to settling tank 34, and the formed precipitates are separated by settling, and then the treated water is discharged as effluent through conduit 38. The precipitates (settled flocs) are recovered through a conduit 37 as excess sludges. A part of the treated water may be returned to the aeration tank 10 through a conduit 50. When the BOD concentration of the treated water is outside control limit value, the treated water is further treated by passing it through another prior known deep aeration tank 41, and then discharged as effluent. The waste water is led to a settling tank 42 and the treated water is discharged from a conduit 43. Return sludge from the settling tank 42 is led to the aeration tank 41 through conduits 44, 45. Air diffusion pipe 46 is provided at the bottom of the aeration tank 41.

The activated sludge is acclimated in the acclimating tank 51 and is introduced into the aeration tanks 10 and 41 through conduits 52, 53 before the treatment of the food industry waste water. After introducing the sludge, the waste water is introduced into the tank 10 and the air is diffused from the air diffusion pipe 12 so that the treatment of the waste water is started and continued.

In the following examples, the activated sludge acclimated in an acclimating tank had a concentration of 1% and was introduced into the aeration tank 10 before the treatment of the food industry waste water.

90 Kg of activated sludge having a similar concentration was introduced into an aeration tank of the type designated by reference numeral 41 in a similar manner.

Examples referring to the present invention will be described in detail.

EXAMPLE 1

Food industry waste water having a BOD concentration of 2,000 ppm was led to an aeration tank of perforated plate type, having a height of 3.5 m, a diameter of 0.5 m, and a liquid charge capacity of 300 liter, in which one air dispersion device, two inside cylinders, one air dispersion device, two inside cylinders, one air dispersion device and two inside cylinders were provided from bottom upwardly in that order, and treated with 120 Kg of activated sludge at a mean liquid temperature of 25° C., an OTR value of 30 mmol $O_2$/liter hour, and a BOD volumic load of 9.8 Kg/$m^3$.d for an aeration time of 3.5 hours, whereby BOD concentration of the treated water was reduced to 195 ppm. The treated water was further treated in another aeration tank of the same type as above at a BOD volumic load of 1.0 Kg/$m^3$.d, and an OTR value of 1 mmol $O_2$/liter hour, for an aeration time of 3.3 hours, whereby treated water having a BOD concentration of 17.5 ppm was obtained.

EXAMPLE 2

Food industry waste water having a BOD concentration of 500 ppm was led to a deep aeration tank having a height of 10 m, a diameter of 0.3 m and a liquid charge capacity of 680 liter, in which five perforated plates were provided at equal distances, and treated therein with 260 Kg of activated sludge at a mean liquid temperature of 25° C., an OTR value of 10 mmol $O_2$/liter hour, and a BOD volumic load of 4 Kg/$m^3$.d for an aeration time of two hours, whereby treated water having a BOD concentration of 45 ppm was obtained.

EXAMPLE 3

Food industry waste water having a BOD concentration of 1,200 ppm was treated with 260 Kg of activated sludge at an OTR value of 20 mmol $O_2$/liter hour and a BOD volumic load of 6.8 Kg/$m^3$.d for an aeration time of 3 hours, using the same apparatus as in Example 2, whereby treated water having a BOD concentration of 96 ppm was obtained.

EXAMPLE 4

Town waste water having a BOD concentration of 300 ppm was treated with 90 Kg of activated sludge at an OTR value of 5 mmol $O_2$/liter hour and a BOD volumic load of 2.5 Kg/$m^3$.d for an aeration time of 2 hours, using the same apparatus as in Example 1, whereby treated waste water having a BOD concentration of 30 ppm was obtained.

EXAMPLE 5

Food industry waste water having a BOD concentration of 3,000 ppm was treated with 120 Kg of activated sludge at an OTR value of 80 mmol $O_2$/liter hour and a BOD volumic load of 13.0 Kg/$m^3$.d for an aeration time of 4.0 hours, using the same apparatus as in Example 1, whereby treated water having a BOD concentration of 300 ppm obtained.

EXAMPLE 6

Food industry waste water having a BOD concentration of 3,000 ppm was treated with 150 Kg of activated sludge at an OTR value of 100 mmol $O_2$/liter hour and a BOD volumic load of 13.5 Kg/$m^3$.d for an aeration time of 4 hours, using the same apparatus as in Example 1, whereby waste water having a BOD concentration of 450 ppm was obtained. However, the settling ability of the activated sludge used was poor and the treated waste water was contaminated with fine flocs.

As described above, oxygen utilization rate or reaction rate is increased in the present invention, and even if a BOD volumic load of waste water is increased, a sufficient treatment can be made. Thus, waste water containing organic materials can be treated with a high efficiency, and the necessary apparatus for aeration treatment can be made more compact, and also the area necessary for the aeration tank can be reduced. These significant effects can be attained in the present invention.

What is claimed is:
1. An apparatus for high-efficient microbiological oxidation treatment of waste liquid containing organic materials comprising:
   an aeration tank body having a height that is from 5 to 30 meters and a diameter of from 0.5 to 10 meters that is substantially less than the height;
   first feed means for introducing influent waste liquid containing organic materials into said aeration tank body;
   second feed means for introducing activated sludge into said aeration tank body;
   means for supplying and for diffusing air into the waste liquid, said air supply and diffusion means being provided at the bottom of said aeration tank body;
   at least one air dispersion means provided above said air supply and diffusion means for dispersing the air ascending from the bottom of said aeration tank body into fine air bubbles, said air dispersion means comprising a cylindrical skirt provided with a perforated disc-like plate extending across one end of the skirt;
   a plurality of open cylinders, each of said open cylinders comprising a cylindrical skirt, each of the cylindrical skirts of said open cylinders and said air dispersion means being of substantially the same diameter, said open cylinders being aligned directly above said air dispersion means with a predetermined vertical distance from each other above said air supply and diffusion means, the cylindrical skirts being disposed coaxially with said aeration tank body and defining an annular space with the inner wall of said aeration tank body, the cylindrical skirts forming partially circulating streams of the waste liquid along the inside and the outside of the cylindrical skirt and forming an overall circulating stream ascending along the center parts of the skirts and descending through the annular space, the cross-sectional area of each of said dispersion means and said open cylinders being in a range of 50 to 80% of the cross-sectional area of said aeration tank body; and
   discharge means for removing effluent treated liquid from said aeration tank body.

2. An apparatus according to claim 1, wherein said aeration tank body comprises a cylindrical vessel and said cylindrical skirts are positioned centrally within said cylindrical vessel.

3. An apparatus according to claim 1, wherein a diameter of each perforation is between 5 and 30 mm and a perforation ratio of the perforated plate is at least 20%.

4. An apparatus according to claim 3, wherein length of the cylindrical skirt of the air dispersion means is in a range of ¼ to ⅔ of the diameter of the perforated plate.

5. An apparatus according to claim 4, wherein the length of the cylindrical skirt of the open cylinder is also from ¼ to ⅔ of the diameter of the cylindrical skirt of said air dispersion means.

6. An apparatus according to claim 1, wherein the distance between the air dispersion means and open cylinders, is approximately equal to the diameter of the open cylinders.

7. An apparatus according to claim 1, wherein said aeration tank body has a cylindrical shape with a diameter that is from 1/10 to ½ of the height of said aeration tank body.

8. An apparatus according to claim 1, wherein distance between the open cylinders is approximately equal to the diameter of the open cylinders.

9. An apparatus for high-efficient microbiological oxidation treatment of waste liquid containing organic materials comprising
an aeration tank body whose height is from 5 to 30 meters and whose diameter is from 0.5 to 10 meters, said diameter being substantially less than the height;
first feed means for introducing influent waste liquid containing organic materials into said aeration tank body;
second feed means for introducing activated sludge into said aeration tank body;
means for supplying and for diffusing air into the waste liquid, said air supply and diffusion means disposed at the bottom of said aeration tank body;
a plurality of air dispersion means, each of said means comprising a cylindrical skirt provided with a perforated disc-like plate extending across one end of the skirt, the respective cross-sectional areas of each of said air dispersion means being in a range of 50 to 80% of the cross-sectional area of said aeration tank body, each of the cylindrical skirts of said air dispersion means being of substantially the same diameter and being aligned with a predetermined vertical distance from each other above said air supply and diffusion means, the cylindrical skirts being disposed coaxially with said aeration tank body and defining an annular space with the inner wall of said aeration tank body, the cylindrical skirts forming partially circulating streams of the waste liquid along the inside and the outside of the cylindrical skirts and forming an overall circulating stream ascending along the center parts of the skirts and descending through the annular space; and discharge means for removing effluent treated liquid from said aeration tank body.

10. An apparatus for high-efficient microbiological oxidation treatment of waste liquid containing organic materials comprising:
(a) a vertically disposed, elongated cylindrical aeration tank body having a length substantially greater than the width;
(b) first feed means for introducing influent waste liquid containing organic materials into the upper end of said cylindrical tank body;
(c) second feed means for introducing activated sludge into the upper end of said cylindrical tank body;
(d) means for supplying and for diffusing air into the lower end of said cylindrical tank body;
(e) at least one air dispersion means in said cylindrical tank above said air supply and diffusing means for dispersing air into fine bubbles, each of said air dispersion means comprising a first cylindrical member having a cross section less than that of the cylindrical tank and a perforated disc-like plate extending across one end of said first cylindrical member, said first cylindrical member forming a cylindrical skirt beneath said perforated disc-like plate, said cylindrical skirt being disposed coaxially with said cylindrical tank and defining an annular space with the inner wall of said cylindrical tank;
(f) a plurality of open-end cylinders of substantially the same diameter as the cylindrical skirt of said air dispersion means, said open-end cylinders being disposed coaxially in vertical array above said air dispersion means, each of said open-end cylinders forming an annular space with the inner wall of said cylindrical tank and separated from each other and from each air dispersion means by a predetermined vertical distance, said vertical array extending substantially the height of the cylindrical tank, the diameters of said air dispersion means and said open-end cylinders and the vertical spacing between them being such as to cause air-induced circulation of liquid in said cylindrical tank to follow an upward axial path through said vertical array to return downward along the wall of said cylindrical tank through said annular spaces; and
(g) discharge means for removing effluent treated liquid from said aeration tank body, said discharge means being positioned at substantially the same level as said first feed means.

* * * * *